Patented July 2, 1940

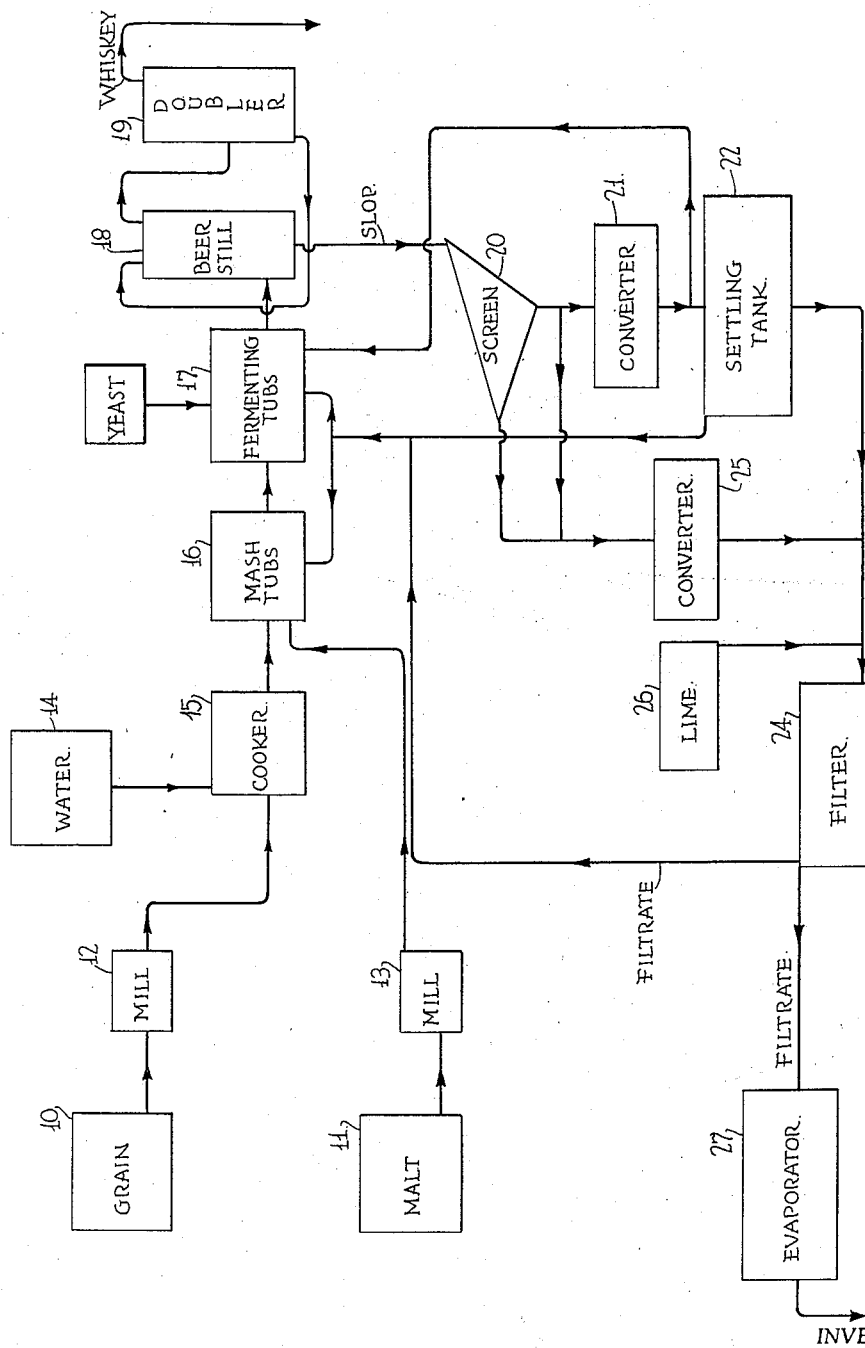

2,206,024

UNITED STATES PATENT OFFICE 2,206,024

MANUFACTURE OF ALCOHOL

Charles R. Brown, Champaign, Ill., assignor to The Sharples Corporation, a corporation of Delaware Application August 10, 1937, Serial No. 158,369

10 Claims. (Cl. 195—32)

The present invention pertains to the manufacture of alcohol and is particularly concerned with the manufacture of alcoholic beverages. This application is a continuation in part of my prior application Serial No. 76,087, filed April 23, 1936, for Treatment of distillery slop. In my prior application, a procedure is described in which distillery slop is subjected to the application of high temperature at pressures substantially in excess of atmospheric pressure, such pressure, e. g., equilibrium pressure, being applied in order to keep the slop liquid at the temperature employed.

In that process, the slop obtained as a residue from distillation following fermentation to produce ethyl or other alcohols is subjected to a temperature substantially in excess of its atmospheric boiling point for a period of time sufficient to convert the slop into a form in which it may be filtered through cloth with facility. Such heating apparently effects a conversion of the gummy and albuminous impurities of the slop into a form in which these impurities do not cause cloggage of the filter cloth such as would occur if an attempt were made to filter the slop in the absence of such preliminary conversion. In the performance of that process the slop is subjected to a temperature substantially in excess of its atmospheric boiling point at a superatmospheric pressure considerably in excess of fifteen pounds per square inch, the pressure being maintained sufficiently high to keep the slop in the liquid phase. The temperature necessary to effect efficient conversion will ordinarily be in excess of 273° F. and the operation of heating to effect conversion will ordinarily be continued for a period of at least ten minutes and usually one-half hour or longer, depending upon the particular character of the slop, i. e., upon the grain from which the slop is produced and the character of the grinding, cooking and mashing operations as they affect the presence of unconverted starchy materials in the slop solids.

The principal advantages stressed in the prior application related to the concentration of the filtrate resulting from filtration of the converted steep liquid and to the recovery of vegetable oil from the filter cake. In accordance with the present invention, the filtrate from the filtering operation which follows the pressure conversion step is reused in the manufacture of further alcohol. In the preferred embodiment of the invention, this reuse involves recycling of the filtrate to the conventional mashing and/or fermenting operations employed in the manufacture of alcohol.

The invention will be best understood by reference to the attached flow sheet, in which the single figure represents the application of the invention to a conventional whiskey-making process. The numerals 10 to 19 on the flow sheet illustrate the conventional steps of a whiskey-making process and the conventional apparatus employed in whiskey-making. Grain from container 10 may be ground in a mill 12, mixed with water from a container 14 and cooked in a cooker 15. Malt from container 11 may be ground in mill 13 and mixed with the cooked grain from cooker 15 in the mash tubs 16. After the mashing operation, the mash may be passed to fermenting tubs 17. The fermented mixture may be passed to a conventional beer still 18 from which the distillate passes to a doubler 19 in which the conventional whiskey distilling operation takes place. The residue from the doubler 19 is returned to beer still 18 for further distillation. From time to time distillery slop is removed from the beer still 18.

In the practice of the invention, all of the steps above described may be practiced in accordance with procedure well known to the prior art. The novel features of the invention relate to the treatment of the distillery slop removed from the still 18 and the recovery of further alcohol from this slop.

In the practice of the invention, slop from the still 18 is first passed to a screen 20 which removes the coarser solids. The screened liquid is then passed to a converter 21. This converter may be any suitable form of heater in which the slop may be heated under pressure to a temperature substantially in excess of its atmospheric boiling point. It may be an ordinary autoclave or it may be in the form of a continuous apparatus through which the slop may be passed while it is heated under pressure to a temperature in excess of 258° F. for a period of time sufficient to convert the slop into a state in which it can be filtered through cloth with facility. In the conversion of slop obtained as the result of the manufacture of alcohol from rye, for example, the converting operation may ordinarily be accomplished by heating the slop to a temperature of 287° F. for a period of ten minutes. The converted slop may then be passed to a settling tank 22 from which clear liquid is decanted.

It should be noted that the converting operation performed in converter 21 effects changes in the gummy, albuminous, starchy and oily constituents of the slop to a state in which they can be settled in settling tank 22 to effect decantation of a clear liquid from the slop sludge, a result which could not be obtained unless the preliminary converting operation in the converter 21 were first performed.

As stated above, the converted slop may be filtered through cloth with facility. This filtration operation may be accomplished in a conventional plate and frame pressure filter press provided with a filter duck. As the result of the treatment of the slop in converter 21, the filtering operation may be performed continuously without plugging the filter cloth.

An alkaline reagent is preferably added to the slop sludge from tank 22 prior to filtration, as indicated at 26. In case the alkaline reagent is a hydroxide or carbonate of an alkaline earth metal (e. g., lime), the addition of that reagent will also assist in the filtering operation indicated at 24. The addition of an alkaline reagent at this stage of the operation improves the process, since a larger proportion of the filtrate may be recycled to the mash tubs 16, as hereinafter described, than could be accomplished if the acid filtrate resulting from filtration of the sludge without previous liming were recycled to the mash tubs. The settled slop sludge from settling tank 22 (with or without addition of alkali) is filtered through filter 24. A part or all of the filtrate from the filter 24 is returned to the mashing and fermenting operations. This filtrate is preferably returned to the mash tubs 16, or, alternatively, a part of it may be returned to the fermenting tubs 17. The liquid decanted from tank 22 may likewise be subjected to a further fermenting operation in the same manner as the filtrate from the filter 24. Because of its higher acidity, it is, however, preferably returned to the fermenting tubs 17.

Further fermentable material is also preferably obtained by the dilution and separate conversion of solids removed from the screen 20 as indicated at 25, the converting operation being in general similar to (but usually more intensive or prolonged than) that performed in converter 21. A part of the solids converted at 21 may also be recycled directly to the fermenting tubs as indicated on the flow sheet.

Alternatively, the filtrate from the filter 24 and the clear liquid decanted from the settling tank 22 may be separately mixed with yeast and subjected to a fermenting operation entirely separate from the fermenting operation performed upon the grain from container 10.

The part of the filtrate not returned to the mashing and fermenting steps is preferably passed through a conventional multiple effect evaporator as described in my prior application, Serial No. 76,087, referred to above.

I am aware that it has been common in the prior art to screen distillery slop liquid and to return a part of the screened liquid to the fermenting tubs in the conventional fermenting operation. This operation is known as "slopping back." The practice of the procedure of the present invention in which the slop is subjected to a special converting operation in the converter 21 and the solids are separated from this slop in settling tank 22 and/or filter 24, and only the clear liquid is returned, has very considerable advantages over the prior art process of "slopping back."

The practice of slopping back in accordance with the prior art causes a number of undesirable fermentation side reactions, and the quantity of material which may be slopped back without causing the side reactions to develop to a prohibitive extent is accordingly very limited. Oils and solids returned to the fermenting operation in the practice of the prior art process of slopping back tend to blanket the yeast and thus to lower the conversion of the mash in the fermenting tubs into alcohol. In the practice of the present invention, on the other hand, a large part of the content of the screened slop which would otherwise enter into these side reactions is removed and only a clear liquid is returned. Many of the oils and solids which inhibit fermentation are removed, and as a result of the removal of materials tending to cause undesired side reactions and to blanket the yeast, a larger proportion of fermentable material may be returned to the fermenting step than in the prior practice of slopping back.

A further advantage of the practice of the invention consists in the fact that the converting operation performed in converter 21 changes starch in the distillery slop into dextrins and sugars, thereby making a large amount of additional material available for fermentation.

Modifications will be obvious to those skilled in the art and I do not therefore wish to be limited except by the scope of the subjoined claims as interpreted in the light of the spirit of the invention.

I claim:

1. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility, separating a clear liquid from said slop and subjecting said clear liquid to fermentation to produce further alcohol therefrom.

2. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility, separating a clear liquid from said slop by subsidence and subjecting said clear liquid to fermentation to produce further alcohol therefrom.

3. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility, separating a clear liquid from said slop by filtration and subjecting said clear liquid to fermentation to produce further alcohol therefrom.

4. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility, separating a clear liquid from said slop and subjecting said clear liquid to fermentation together with a fresh alcohol-producing mash to produce further alcohol therefrom.

5. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility, separating a clear liquid from said slop by subsidence and subjecting said clear liquid to fermentation together with a fresh alcohol-producing mash to produce further alcohol therefrom.

6. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility, separating a clear liquid from said slop by filtration and subjecting said clear liquid to fermentation together with a fresh alcohol-producing mash to produce further alcohol therefrom.

7. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility, separating a clear liquid from said slop by subsidence and separating a further quantity of clear liquid from said slop by filtration and subjecting said clear liquids separated by subsidence and filtration to fermentation to produce further alcohol therefrom.

8. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility and additional alcohol may be recovered therefrom, thereafter adding an alkali to said converted slop, separating a clear liquid from said alkali-treated converted slop, and subjecting said clear liquid to further mashing and fermentation steps to produce further alcohol therefrom.

9. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility and additional alcohol may be recovered therefrom, thereafter adding an alkali to said converted slop, separating a clear liquid from said alkali-treated converted slop by filtration, and subjecting said clear liquid to further mashing and fermentation steps to produce further alcohol therefrom.

10. The process of producing alcohol which comprises heating distillery slop obtained by the fermentation of grain to a temperature in excess of 258° F. while keeping said slop in the liquid phase by maintaining it under pressure and continuing the application of heat to said slop until it has been converted to a state in which a clear liquid may be separated therefrom with facility and additional alcohol may be recovered therefrom, thereafter adding an alkali to said converted slop, separating a clear liquid from said alkali-treated converted slop, mixing said clear liquid with a fresh alcohol-producing mash, and subjecting said clear liquid, together with said fresh alcohol-producing mash to further mashing and fermenting steps to produce further alcohol therefrom.

CHARLES R. BROWN.